United States Patent [19]

Krause et al.

[11] 4,005,818
[45] Feb. 1, 1977

[54] PULSE SIGNALING SYSTEM

[76] Inventors: Ernst H. Krause; Claud E. Cleeton, c/o Naval Research Laboratory, Anacostia Station, Washington, D.C. 20020

[22] Filed: May 11, 1945

[21] Appl. No.: 593,174

[52] U.S. Cl. .............................. 325/38 R; 325/143; 343/226; 343/225; 325/44
[51] Int. Cl.² .......................................... H04B 1/00
[58] Field of Search ........................ 177/353.6, 353; 343/228, 226, 225; 325/38 R, 44, 143, 325; 179/1.5 R

[56] References Cited

UNITED STATES PATENTS 2,513,291  7/1950  Deloraine et al. .................... 325/44

*Primary Examiner*—Howard A. Birmiel
*Attorney, Agent, or Firm*—R. S. Sciascia; Philip Schneider

EXEMPLARY CLAIM

1. A radio pulse signalling system comprising, in combination:
    means for generating a first time base consisting of a finite number of regularly time-spaced pulse signals;
    first means for forming a pulse code group from said time base signal in accordance with a preselected pattern, said pulse code group always including an initial starting pulse;
    means for transmitting a pulsed radio wave corresponding to said pulse code group;
    means for receiving said pulsed radio wave at a remote point;
    means, actuated by the initial starting pulse in said received wave, for generating a second time base corresponding to said first time base; and
    second means for forming a pulse code group corresponding to the transmitted pulse code group from said second time base signal.

6 Claims, 6 Drawing Figures

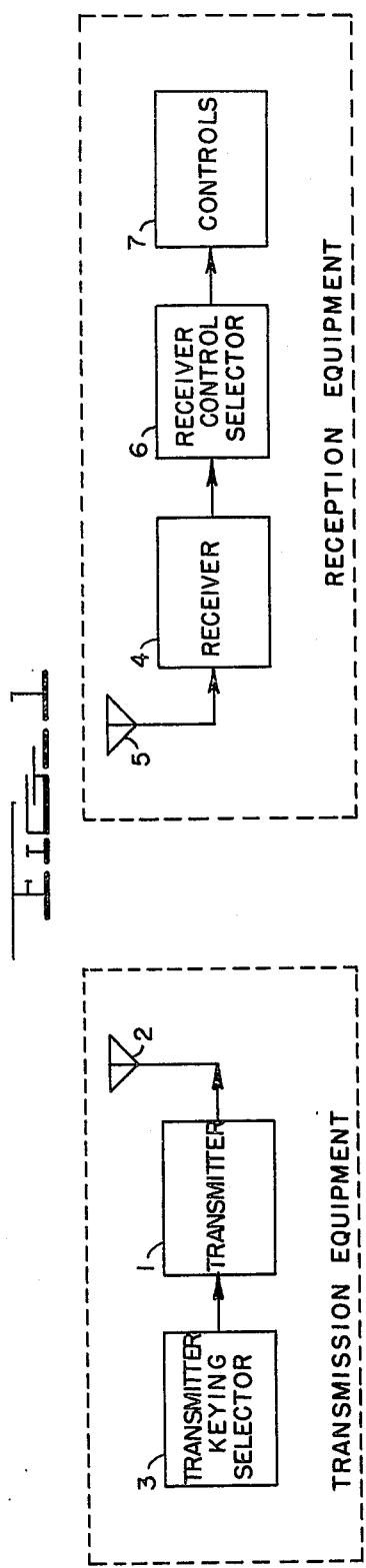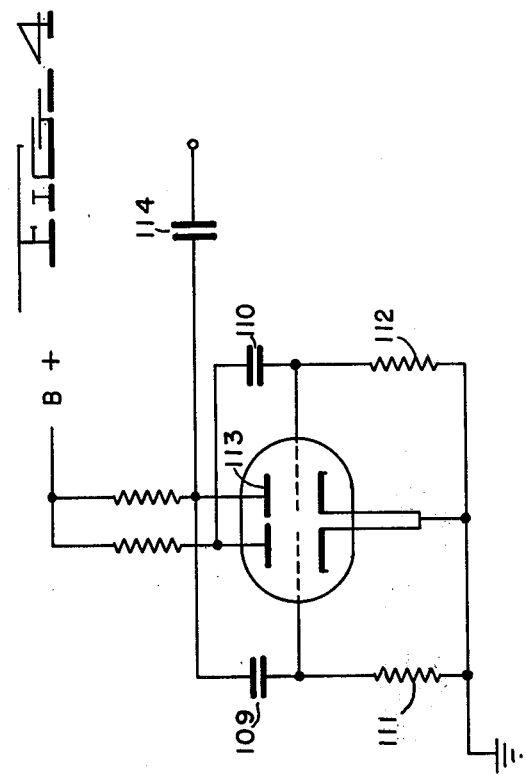

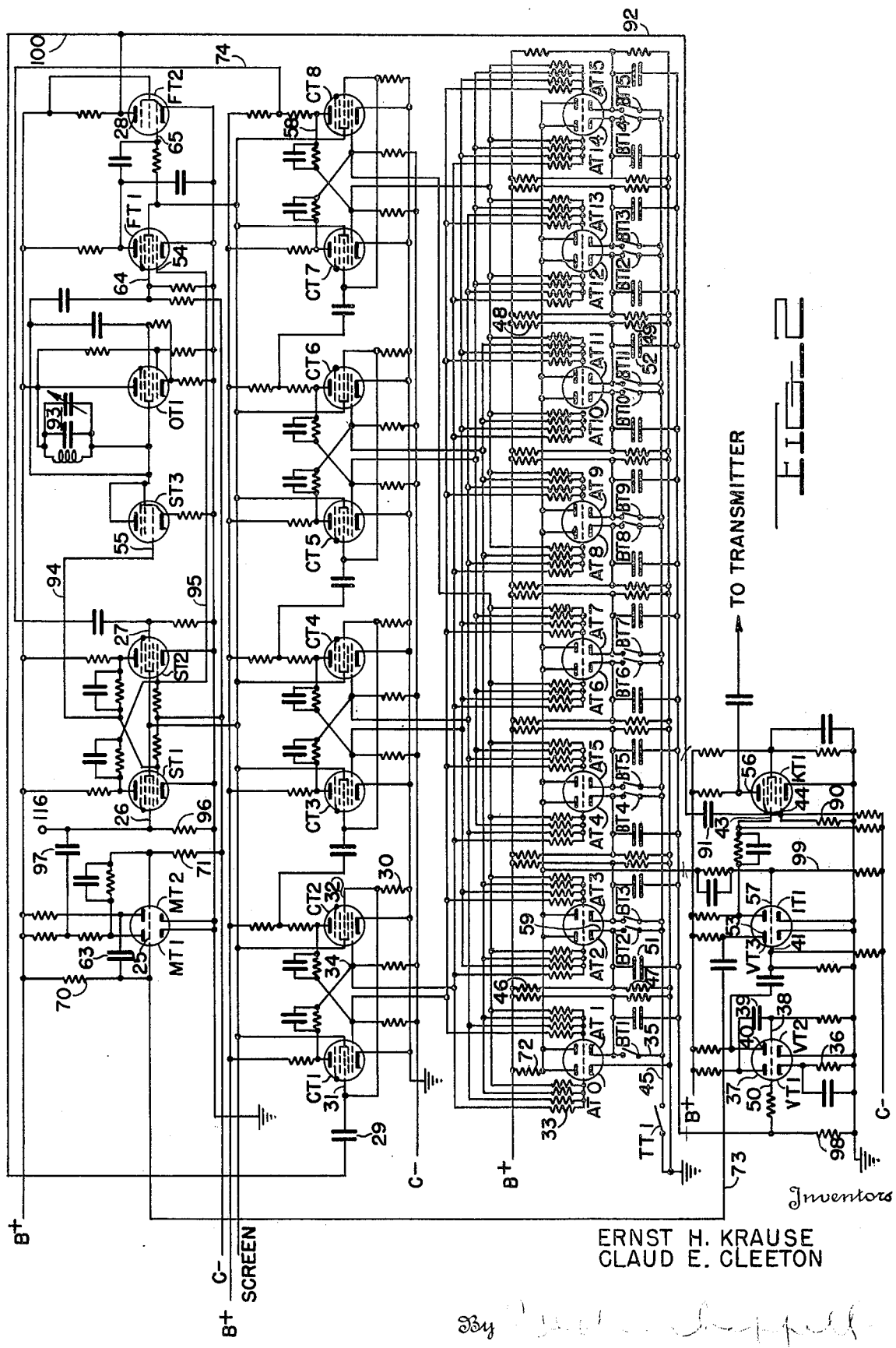

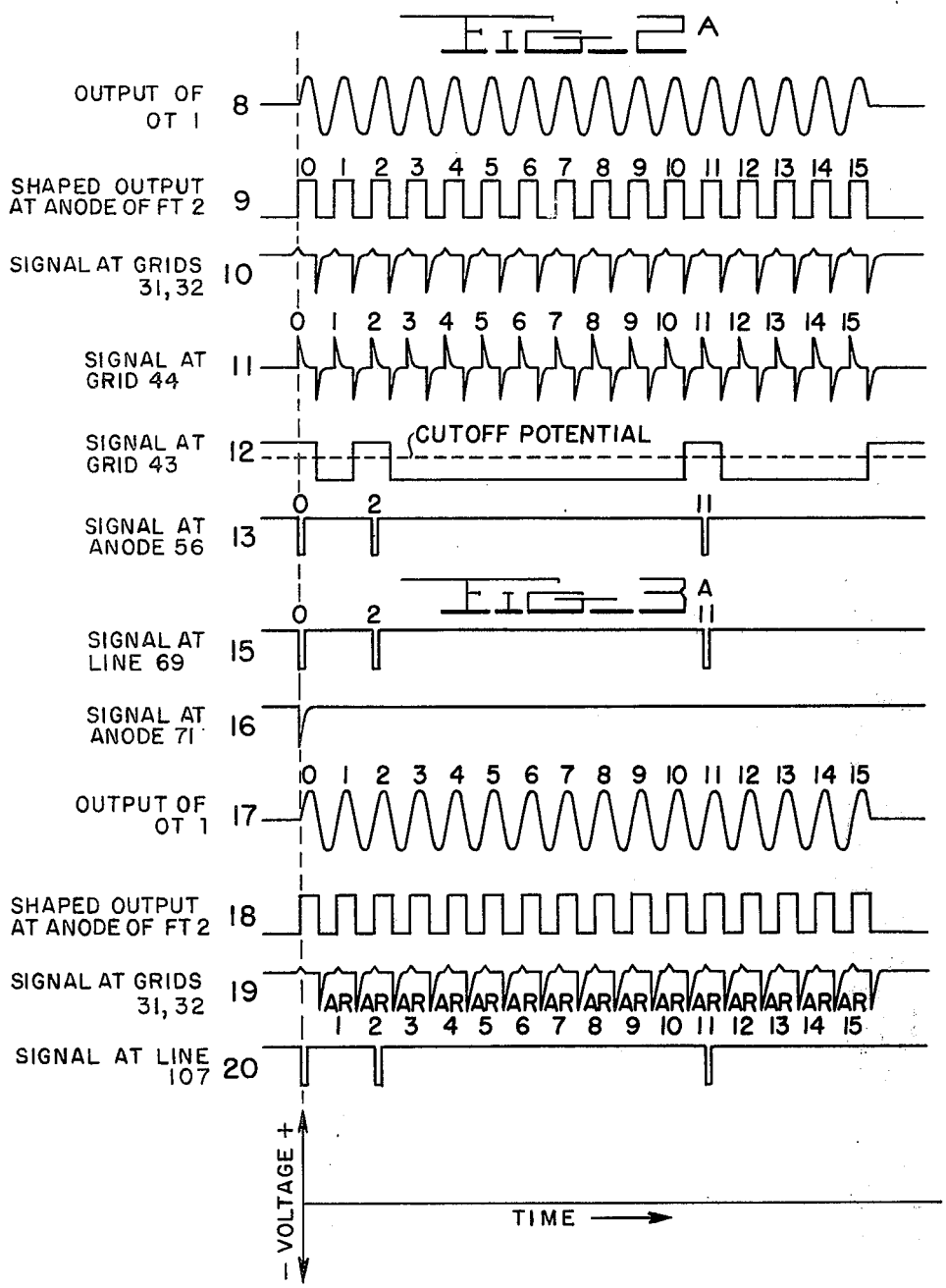

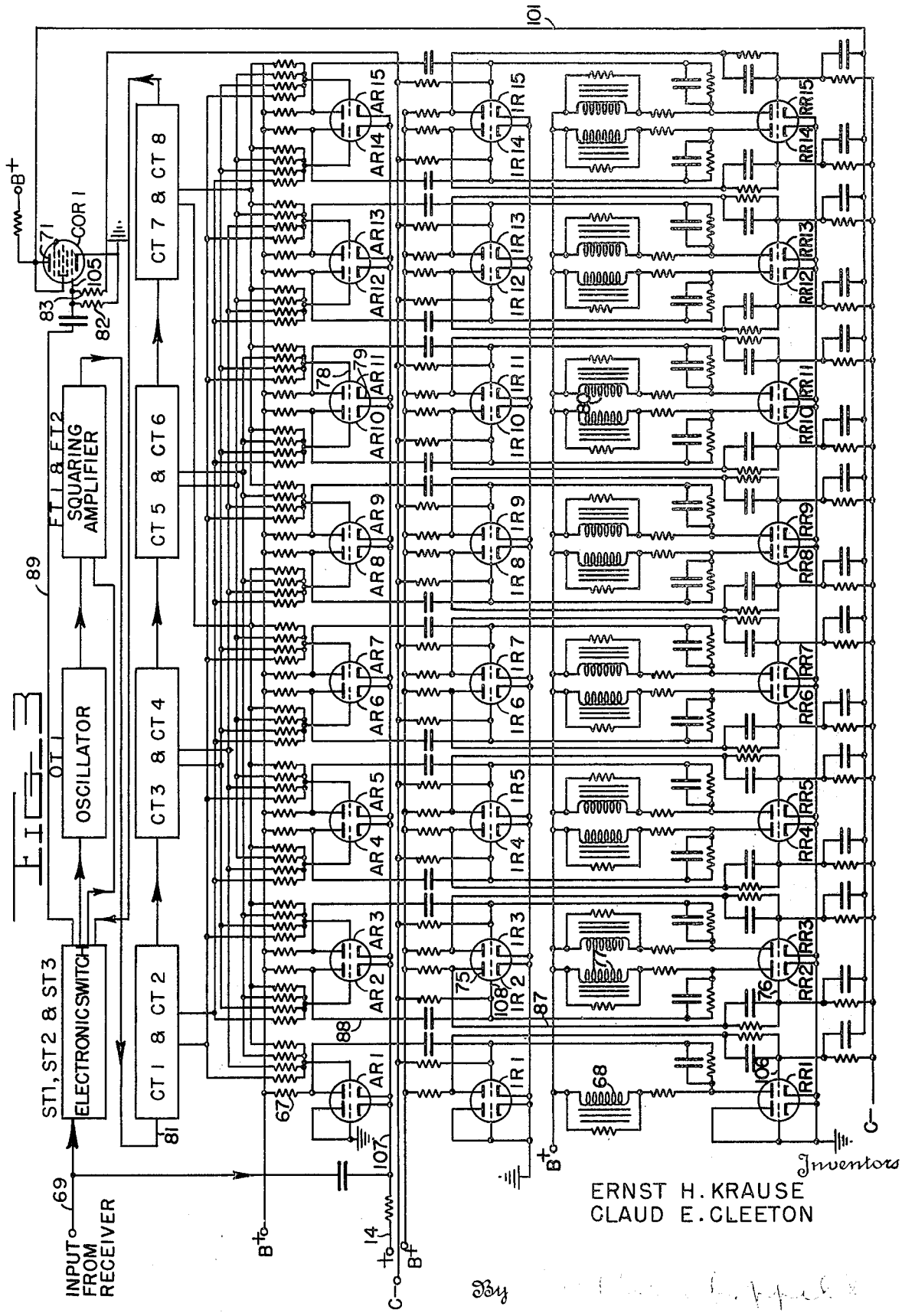

PULSE SIGNALING SYSTEM

This invention relates broadly to a radio type intelligence transmission system and in particular to a radio pulse type signalling system wherein the time occurrence of the pulse signals is used to convey the intelligence of the transmission.

In accordance with the teachings of this invention, a group of two or more electrical impulses is transmitted over a given time interval. The desired message is conveyed by the arrangement of the electrical impulses comprising the group with respect to the start of the interval of group transmission. The group structure, that is, the disposition of impulses in the group, may be altered according to the information it is desired to send. A timing device is employed at the transmitting source to provide a time pattern from which the group structure to be transmitted is formed and another timing device or plurality of timing devices is employed at the receiving end to provide a pattern into which the received group is fitted for translation into intelligence. The transmitter timing device and the receiver timing equipment are cooperative in their actions in that the operation of the latter is initiated in a definite time relation to the initiation of operation of the former and the two generate time bases, the unit intervals of which bear substantially constant and definite relationship to each other.

It is an object of this invention to provide a radio pulse type system of intelligence transmission.

It is another object of this invention to provide a radio pulse type signalling system wherein the intelligence of a transmission is conveyed by the number and time occurrence of electrical impulses.

It is another object of this invention to provide a pulse signalling system wherein the number and time occurrence of the pulse signals relative to the start of the transmission interval may be selectively predetermined and subsequently redetermined.

It is another object of this invention to provide a signalling system wherein the information transmitted may be rendered unintelligible to other than those for whom such information is intended.

It is another object of this invention to provide a pulse signalling system wherein a very short interval of time is required for the transmission of a complete message.

It is another object of this invention to provide a signalling system wherein the energy required for the transmission of a given intelligence is markedly reduced thereby accomplishing economies in transmitter equipment.

It is another object of this invention to provide a radio signalling system whereby control may be exercised over a remote mechanism with a maximum of security from interference and interception and with a minimum of transmitted energy.

Other objects and features of this invention will become apparent upon careful consideration of the following detailed description when taken together with the accompanying drawings in which:

FIG. 1 is a simplified block diagram of one embodiment of the invention,

FIG. 2 is a detailed circuit diagram of the transmitter keying selector 3 shown in FIG. 1, FIG. 2A is a series of waveforms illustrative of the action of the circuit shown in FIG. 2, FIG. 3 is a detailed circuit diagram of the receiver control selector 6 shown in FIG. 1, FIG. 3A is a series of waveforms illustrative of the action of the circuit shown in FIG. 3, FIG. 4 is a circuit diagram of a means for automatically and repetitiously setting the circuit of FIG. 2 into operation.

Referring now in particular to FIG. 1 wherein there is shown transmitting equipment and receiving equipment arranged to permit the transmission and reception of radio pulse signals in the manner taught by the invention. For purposes of illustration, the invention is here shown as a means for selectively actuating any one of several controls at the point of reception, such point of reception being remote from the point of transmission. Transmitter 1 is preferably of the pulse emission type in which pulses or bursts of high frequency energy of extremely shot time duration (5-10 microseconds) but high peak power are transmitted from antenna 2, which may be directional or omni-directional whichever is desired. The transmitter keying selector 3 is in part a timing device which is arranged to key the transmitter 1 in which a manner as to provide the desired pulse group structure. Receiver 4 is of the pulse reception type in which pulses of high frequency energy received on antenna 5 are amplified and detected in the usual manner so that a video signal comprising the envelope of the high frequency pulse energy is fed to receiver control selector 6. The latter is a timing device similar in construction to the transmitter keying selector 3, arranged to actuate the controls 7 according to the received pulse group structure. Controls 7 represent, for example, the rudder, elevator, throttle, torpedo release, and similar controls of a remotely controlled drone aircraft in which the reception equipment is located. Such a drone aircraft represents, for example, a pilot-less airborne craft fraught with explosives in which event controls 7 would be exercised to direct the drone against a defended target from the safety of a remote point.

As aforementioned, transmitter 1 is preferably of the high peak power type, which permits receiver 4 to be operated under conditions of low sensitivity, thereby minimizing the effect upon the receiver of interference signals resulting from either natural or man-made sources. Further, transmitter 1 and receiver 4 may be of a type arranged to transmit and receive only pulses of a definite pre-determined character as described in our copending application, Ser. No. 582,966, entitled "Double Pulse Generator", by Claud E. Cleeton, Ernst H. Krause and Nolan R. Best, filed March 15, 1945, thereby further reducing the possibility of interference.

Included in transmitter keying selector 3 is a set of on-off toggle type switches corresponding to the various desired functions accomplished by controls 7. As will be explained in the following paragraphs, an operator stationed at the transmitting equipment may close one or several of these switches in order to control the drone aircraft. The transmitter keying selector 3 then fits the desired pulses into a definite time pattern and keys the transmitter in accordance with this pattern. The pulse group thus transmitted is received, amplified and detected by receiver 4 and fed into receiver control selector 6. The structure of the detected pulse group is, in effect, fitted into a time pattern generated by the receiver control selector 6, analyzed, and employed to actuate the controls corresponding to the toggle switches closed by the operator.

In FIG. 2 the transmitter keying selector 3 is shown in detail. Starting at the upper left hand corner of the figure, MT1 and MT2 represent the vacuum tube components of a conventional delay multivibrator which has only one stable state of equilibrium (MT1 conducting and MT2 non-conducting) but which will maintain, upon receipt of a negative signal at grid 25 of MT1, a second state (MT2 conducting and MT1 non-conducting) for a definite interval of time which may be used for delay purposes as hereinafter described. The time interval for which the second state of the multivibrator can be maintained is determined by the time constant circuit formed by condenser 63 and resistance 70. As MT1 and MT2 are driven into non-conduction and conduction respectively to produce the delay period state of the multivibrator, the plate of MT2 is thereby driven sharply negative and condenser 63, which is fully charged, holds grid 25 of MT1 below cut-off until it partially discharges through resistance 70. ST1 and ST2 represent the vacuum tube components of a conventional scale-of-two counter or electronic switch which has two stable states of equilibrium (ST1 conducting and ST2 non-conducting or vice versa) either of which may exist according to the signals impressed upon the second control grids 26 and 27 of ST1 and ST2. ST3 represents a single vacuum tube employed as a switch, the control grid of which is connected to the grid of ST1 through lead 94 so as to conduct current for one state of equilibrium (ST1 conducting and ST2 non-conducting) and to become non-conducting in response to the other state of equilibrium (ST2 conducting and ST1 non-conducting). OT1 represents the vacuum tube component of a "negative trans-conductance" or "transitron" oscillator whose tank circuit 93 is serially disposed in the plate of ST2 and which operates in the manner described in co-pending application, Ser. No. 537,286, entitled "Calibrating Apparatus" by Laverne R. Philpott, filed May 25, 1944. When ST3 is conducting, its plate current will hold OT1 quiescent, but when ST3 becomes non-conducting OT1 generates, for example, a ten kilo-cycle sine wave which always starts at zero phase, proceeds in a positive direction on the initial excursion and reaches maximum amplitude on the first half cycle of the sine wave. FT1 and FT2 represent the vacuum tube components of a two stage squaring amplifier which is connected to the output of OT1 and functions to amplify and square up the sine wave output from OT1 so that the signal on plate 28 of FT2 is a series of substantially rectangular positive pulses of time duration and spacing both equal to a half period of OT1 oscillator frequency. The mode of operation of MT1, MT2, ST1, ST2, ST3, FT1 and FT2 by means of which a stable train of positive pulses is thus generated is described in co-pending application Ser. No. 595,222, entitled "Controllable Pulse Generator" by Harold Lyons, filed May 22, 1945, now U.S. Pat. No. 2,475,625.

FT1 has its second control grid 64, to which the sine wave output of the oscillator OT1 is applied, returned to a source of C- voltage so that it will only pass and amplify the positive half cycles of the sine wave input. There will thus appear on the plate of FT1 a series of clipped negative half cycles of sine wave voltage which is applied to control grid 65 of FT2. The control grid of this tube is returned to a positive source of potential which is arranged so that the negative half cycles of input will drive FT2 below cut-off to thereby produce at plate 28 of the latter a series of rectangular positive voltage pulses having the above described characteristics. CT1 and CT2 represent the vacuum tube components of a scale-of-two counter stage, of a four stage, scale-of-sixteen electronic counter. Likewise CT3 and CT4, CT5 and CT6, and CT7 and CT8 represent the second, third and fourth stages respectively of the electronic counter. The positive pulse output of squaring amplifier stages FT1 and FT2 is impressed upon the electronic counter through lead 100 and a low time constant circuit comprising capacitor 29 and resistor 30 in such a manner that the pulses are differentiated thereby forming and applying to the second control grids 31 and 32 of CT1 and CT2 alternate positive and negative peaked signals corresponding respectively to the leading and trailing edge of said positive pulse output.

The counter circuit, as shown, is made up of multiple grid tubes and by its design, responds only to the negative peaked signals applied to the second control grids so that the electronic counter circuit acts to count the trailing edges of the output pulses from squaring amplifier FT1 and FT2. AT0 through AT15 comprise the vacuum tube components of a series of triode type pulse keying channels. In all of these channels the plate of the triode is connected to a common load resistance 72, (shown at the plate of the AT0 tube) while the cathode of each triode, except AT0, is provided with its own bias supplied by separate voltage dividing resistances, typified in the AT2 channel by resistances 46 and 47 and their connection between B+ and ground. Also the grid of each of the triodes is connected through a separate resistance to one of the grid circuits in each of the four counter stages. The latter connection is typified in the AT0 channel by the connection of the grid resistance 33 to the grid circuit 34 of the first counter stage. These inter-connections are so made that a different one of the AT tube series is driven conducting by the counter circuit during each of the total of sixteen states which can exist in the scale-of-sixteen counter. A detailed analysis of this action is given in an application Ser. No. 582,964, by E. H. Krause entitled "Electronic Integrating System", filed Mar. 15, 1945, and in this particular instance consists of consecutively removing the bias from the grids of the AT series tubes as the counter circuit is driven through a complete cycle of operation. Further, the interconnection of the grids of the AT tubes to the counter is so made that amplifier AT0 only is conducting in the quiescent or zero state of the counter, which is prior to the dispatch of a transmission. After the circuit is set into operation and the counter starts to change states, AT1 becomes the only AT tube capable of conducting after the arrival of the first negative peaked signal at the counter input, AT2 becomes the only AT tube capable of conducting after the second negative signal to the counter and so down the series of AT tubes until AT0 again becomes the only conducting tube after the sixteenth negative signal to the counter. BT1 through BT15 represent on-off toggle type switches in the cathode leads of the AT1 through AT15 amplifier tubes, typified by cathode lead 35 of AT1, and correspond to controlled functions in the drone as hereinbefore mentioned. As can be seen, the BT switch in the cathode lead of a given AT tube must be closed before that tube can conduct and amplify when it is unbiased by the counter. TT1 represents an on-off switch which, when open (off position), isolates common cathode lead 45 of all the AT series except AT0 from ground. When closed (on position), TT1 permits conduction insofar as common cathode lead 45 is concerned. VT1 represents a cathode biased amplifier employing grid circuit clipping. The quiescent condition, which VT1 assumes by virtue of the flow of plate current through cathode biasing resistor 36 provides for the amplification by VT1 of input signals to its grid 50 which are either positive or negative with respect to ground. VT2 represents an unbiased amplifier upon the grid of which are impressed the signals appearing at plate 37 of VT1 which may be either positive or negative. A positive signal at grid 38 of VT2 causes grid current flow and charging of capacitor 39 in such a fashion that, upon decay of the positive signal when grid current can no longer flow, grid 38 is driven below ground potential and a positive signal appears at plate 40 of VT2. A negative signal at grid 38 of VT2 also causes a positive signal at plate 40 so that a positive signal thus appears at plate 40 of VT2 regardless of the polarity of the signal applied to VT1. This positive signal from the plate 40 of VT2 is impressed on the grid 41 of amplifier stage VT3 and causes a strong negative signal to appear at its plate 53.

KT1 is essentially a keying tube for keying the transmitter (not shown) from the output of the squaring amplifier FT2 under control of IT1 which in turn is driven by the AT series tubes. The output from FT2 is applied to the first control grid 44 of KT1 through lead 92 and a low time constant coupling circuit consisting of capacitor 91 and resistance 90, which converts the positive pulse output from FT2 into alternate positive and negative peaked signals corresponding respectively to the leading and trailing edges of the positive pulses appearing on the plate of FT2. Control grid 44 is returned to a source of C- potential so that KT1 will only amplify and pass the positive peak inputs, and these only when the second control grid 43 of KT1 is unbiased by IT1. The grid of the latter is returned both to the common plate resistance 72 of the AT series tubes and to a source of C- potential. Thus each time one of the tubes in the AT series becomes conducting a negative pulse is applied to grid 57 of the IT1 tube thereby causing its plate to rise positively to unbias the second control grid 43 of tube KT1. The mode of operation of the AT series, IT1 and KT1 is described in co-pending application Ser. No. 599,287, entitled "State Selector", by Carl H. Smith, Jr. and Milton L. Kuder, filed June 13, 1945, now U.S. Pat. No. 2,409,229.

Let it be assumed that the operator wishes to institute the drone aircraft functions corresponding to switches BT2 and BT11 and therefore closes these switches. This raises common cathode lead 45 with switch TT1 open, to the potential above ground existing at the juncture of resistors 46 and 47, to which the cathode of AT2 is connected. This same positive potential exists at the juncture of resistors 48 and 49 to which the cathode of AT11 is connected and at like points associated with all AT series tubes except AT0. The operator then closes switch TT1, grounding common cathode lead 45. AT2 and AT11 cannot conduct however, at the instant of closing TT1, since the grid bias provided to all the AT tubes by the counter when the latter is in a zero state holds all of the AT series nonconducting except for AT0 only, which is conducting as hereinbefore described. Conduction by AT0 causes a negative voltage to be developed across the common AT plate resistor 72 which voltage is impressed upon the control grid of IT1 through lead 99, thereby rendering that tube non-conducting and unbiasing second control grid 43 of KT1. The grounding of common cathode lead 45 by the closing of TT1 discharges the cathode condensers, typified by condensers 51 and 52 connected to the cathodes of AT2 and AT11, through the grid resistor 98 of VT1, to cause a negative signal to be applied to grid 50 of VT1. As previously described, a negative signal impressed upon VT1 causes a negative signal to appear at plate 53 of VT3. This negative signal on plate 53 is communicated through lead 73 to multivibrator MT1 and MT2 which is in its normal quiescent equilibrium state with MT1 conducting and MT2 non-conducting. The multivibrator is thus triggered, MT1 becomes non-conducting and MT2 conducting, and the delay period starts. The positive signal obtained from the plate of MT1 as the multivibrator is triggered is communicated to ST1 through a low time constant circuit condenser 97 and resistor 96, to find ST1 in its quiescent state, which is conducting, and therefor has no effect on electronic switch ST1 and ST2. During the delay period, which is in the order of 0.01 of a second, transient signals which appear at grid 25 of MT1 following the negative triggering signal and which comprise the effect of possible failure of TT1 to achieve full and instantaneous contact and the effect of wiring inductance, are rendered impotent by virtue of the fact that MT1 is biased strongly below cutoff. These transient signals die out during the delay period and thus do not effect the subsequent circuit operation.

The delay period progresses to its end and multivibrator MT1 and MT2 reverts to its normal state dropping the plate voltage on MT1 and thereby impressing a negative signal on ST1 as it does so. This negative signal causes ST1 and ST2 to switch states, rendering ST1 non-conducting and ST2 conducting which has the dual effect of impressing a positive unbiasing potential on first control grid 54 of FT1 through lead 95 and impressing a negative biasing potential on control grid 55 of ST3 through lead 94. Since ST3 can no longer conduct, the current it normally draws through the oscillator tank circuit 93 is abruptly terminated and the transitron oscillator OT1 is rendered operable whereupon a sine wave voltage obtained from the plate side of ST3 is impressed on squaring amplifier stage FT1 and FT2 with the resulting rectangular positive pulse output hereinbefore described.

The positive going leading edge of the initial or zero positive pulse from FT2 is impotent with respect to the counter since the latter is held solely responsive to negative pulses and leaves it in its zero state which comprises CT2, CT4, CT6, and CT8 conducting. As above-mentioned, this counter zero state establishes the zero state in the AT series which consists of AT0 only capable of conducting. The positive pulse output from FT1 and FT2 is also communicated to first control grid 44 of KT1 through lead 92 and the low time constant circuit consisting of capacitance 91 and resistor 90 causes a negative signal to appear at plate 56 of KT1 and be applied to the transmitter (not shown) so that it is keyed and a pulse transmitted, which can be designated as the initial or zero pulse. It will be apparent that this zero pulse will always be transmitted on each pulse group transmission since AT0 is always capable of conducting in the zero state of the counter and has no switch in its cathode to interfere with such conduction.

The negative going trailing edge of the initial or zero positive pulse from FT2 is impotent with respect to KT1 since its first control grid 44 is always biased off in the absence of a positive signal.

This trailing edge impressed on the counter through lead 100, however, supplies the necessary negative signal to institute the counter function and CT1 therefore becomes conducting and CT2 non-conducting. The coincident signal communicated from the plate of CT2 in the first stage to the second control grids of the second stage of the counter is positive and the second stage and remainder of the counter tubes are therefore unaffected. Thus is established the number one state of the counter which in turn establishes the number one state in the AT series which consists of rendering only AT1 capable of conducting insofar as its grid bias alone is concerned. Switch BT1 in the cathode lead of AT1 was not one of those closed by the operator, however, and AT1 cathode is held so high above the grid by its cathode bis that no plate current flows. This means that none of the AT series can conduct and a positive voltage pulse is developed across the common plate resistor 72 of the AT series and is applied to grid 57 of IT1 rendering it capable of conduction. The resulting drop in the plate potential of IT1 biases off second control grid 43 of KT1 and thereby renders impotent the leading edge of the next positive pulse (designated number one pulse) from FT2 which would otherwise have keyed the transmitter. Thus is suppressed from the available pulse group pattern the number one pulse by virtue of the fact that the operator did not choose to close BT1. By the same token, the number two pulse is transmitted since BT2 was closed, the number three pulse through number ten pulse are suppressed, the number eleven pulse is transmitted, and the number twelve through number fifteen are suppressed.

The trailing edge of the sixteenth positive pulse from FT1 and FT2 which concluded the period during which AT15 could have conducted insofar as its grid was concerned, returns the counter to its zero state by rendering CT2, CT4, CT6 and CT8 conducting. This means that a negative signal appears at plate 58 of CT8 which is applied through lead 74 to the second control grid 27 of ST2 causing the electronic switch ST1 and ST2 to return to its zero state. The dual functions of ST1 and ST2 now proceed in the direction such as to unbias ST3 and thereby stop the transitron oscillator OT1 and bias FT1 so as to block the passage of any transient oscillations which follow the termination of controlled operation of OT1. The transmission of the pulse group has been accomplished and the transmitter keying selector is left in the zero state. The transmission cannot repeat itself automatically since a negative signal caused by grounding the cathodes of one or more of the AT series tubes is necessary to start the sequence of operations just described. The pulse group transmission cycle is now complete. The particular pulses corresponding to the functions desired by the operator have been fitted into the pattern provided by the oscillator timing device and transmitted to the drone. In FIG. 2A, voltage waveforms are plotted against time in such a fashion as to illustrate the sequence of events in certain parts of the circuit operation described above. Waveform 8 is representative of the sine wave output of OT1 oscillator. As described above, it starts from zero phase, goes positive on the initial excursion and maintains a uniform amplitude of oscillation throughout the controlled operating time. Waveform 9 represnts the rectangular positive pulse output of squaring amplifier FT1 and FT2 which is communicated through low time constant circuits to produce waveform 10 at the counter input and waveform 11 at grid 44 of KT1. Waveform 12 represents the bias potential maintained at second control grid 43 of KT1 by IT1 during a transmission such as the one just described when BT2 and BT11 are closed. Waveform 13 represents the pulse group structure which appeared at plate 56 of KT1 and was transmitted. From this it can be seen that the oscillator timing device provides the pattern of possible pulses from which those desired for transmission are selected by closing the desired BT switches. Waveform 13 is the result of modulating waveform 9 by deleting one or more of the fifteen pulses after the zero pulse, which is always generated and transmitted as a starting, or synchronizing pulse. Such modulation is a form of pulse code modulation and the group of pulses (e.g., waveform 13) resulting from such modulation can be called a pulse code group.

Neglecting the extremely small time delay introduced by the squaring amplifier circuit, the operating time comprises essentially the time required to close BT2, BT11, and TT1, plus the delay period inaugurated by multivibrator MT1 and MT2, and the time required for fifteen and one half cycles of OT1. The actual time of transmission for the presnt group, however, amounted to only eleven and one half periods of OT1, which, if the frequency of OT1 be chosen as 10 kilocycles per second, equals 1150 microseconds or roughly a millisecond. This represents a very short interval of time in terms of radio signalling and renders usable interception relatively impossible except by the receiver selector means described in subsequent paragraphs of this disclosure. The true significance of this becomes apparent when consideration is given to actual transmitter emission time. If, for example, each pulse of the three pulse group described has a duration of ten microseconds, only 30 microseconds of actual transmitter emission time are required to institute two functions caused by closing BT2 and BT11, in the drone.

It can now be assumed that the drone functions instituted by the foregoing procedure have proceeded to a satisfactory conclusion and the operator wishes to discontinue these functions. For this reason, the operator opens TT1 in FIG. 2, isolating common cathode lead 45 from ground and allowing it to rise to the potential existing at the juncture of resistances 46 and 47. This positive potential, impressed upon grid 50 of VT1 by the charging of capacitors 51 and 52 causes a negative signal to appear at plate 53 of VT3. This signal triggers multivibrator MT1 and MT2 and the sequence of operations begins as before but is altered by the open condition of TT1. Since TT1 is open, the cathodes of all the tubes in the AT series, except ATO, contains a high positive bias, so consequently neither AT2 nor AT11 can conduct when their grid biases are removed by the counter and the transmission therefore comprises only one pulse, the zero pulse transmitted by virtue of ATO in the zero state. The operator now opens BT2 and BT11 rendering the transmission equipment ready for another functional transmission. This opening of BT2 and BT11 when TT1 is open has no effect on the circuit since the cathodes of AT2 and AT11 are at the potential determined by their connection to the voltage dividers between B+ and ground. The manner in which the first transmission, comprising the zero pulse, the number two pulse, and the number eleven pulse, accomplishes the desired functions in the drone and the manner in which the second transmission, comprising only the zero pulse, stops these functions will be explained in the paragraphs which follow. It will be evident, however, that, had the operator wished to continue the operation represented by switch BT11 and to discontinue only that represented by BT2, the procedure would have been somewhat different. This particular result would have called for the operator to leave BT11 and TT1 closed and open BT2. The opening of BT2 causes cathode 59 of AT2 to rise sharply to thereby place a positive signal on grid 50 of VT1 through capacitor 51 which triggers MT1 and MT2. Thus the transmission cycle begins and the transmitted pulse group comprises only the zero pulse and the number eleven pulse. If, on the other hand, the operator had wished to continue the functions represented by switches BT2 and BT11 and had wished to add the function represented by BT7, this desired result would merely have called for the closing of BT7. The closing of this switch causes a negative signal to appear at grid 50 of VT1 and this arrangement causes the transmission of a group comprising the zero pulse, the number two pulse, the number seven pulse and the number eleven pulse. It is thus obvious that the operator of the transmission equipment has considerable flexibility, not only in the number of functions which he can institute but also the order in which he institutes and terminates them.

In FIG. 3 the receiver selector control 6 of FIG. 1 is shown partly in block and partly in detail. The electronic switch ST1 and ST2, oscillator OT1, squaring amplifier FT1 and FT2, and counter stages CT1 and CT2, CT3 and CT4, CT5 and CT6, and CT7 and CT8 of the receiver control selector are shown in block diagram form inasmuch as they perform essentially the same duties as the like components perform in the transmitter keying selector of FIG. 2. Oscillator OT1, when keyed, operates at the same frequency as OT1 in the transmission equipment. Tube COR1 shown in the upper right hand corner of the figure together with the circuit components with which it is immediately associated represent a voltage amplifier which is biased to cutoff potential or slightly below by the connection of grid 105 to ground through resistance 82 and to C-potential through resistance 83. This bias provides that only positive signals applied to grid 105 will be amplified and inverted at plate 71. Negative signals applied to grid 105 only increase the magnitude of the bias. AR1 through AR15 comprise the vacuum tube components of a series of pulse amplifying channels similar to the AT series in the transmitter keying selector except that there is no ARO component and each AR tube has an individual plate load resistor, typified by resistance 67 in the plate circuit of AR1, for providing individual signals to the corresponding tubes of the IR series. The AR series has the respective grid potentials controlled by the sixteen states of the counter as in the transmission equipment. Each IR tube represents essentially one half of an electronic switch, the other half of which comprises the corresponding numbered RR series tube to which it is connected. Each RR tube has a current energized relay coil in its plate circuit typified by coil 68 in the plate circuit of RR1, such relays being used to actuate the functions of the drone through the medium of controls 7 in FIG. 1.

Let it be assumed that the pulse group formed by the closing of BT2 and BT11 in the transmission equipment is received by receiver 4 of FIG. 1, amplified, detected, and fed, in the form of a pulse group of three negative pulses, to input 69 of the receiver control selector of FIG. 3. Pulse zero trips electronic switch ST1 and ST2. The succeeding two pulses, number two and number eleven will not affect the electronic switch since they are also negative and arrive to find the tube to which they are applied in a non-conducting condition. Electronic switch ST1 and ST2, which has been tripped by the zero pulse, starts oscillator OT1, unbiases squaring amplifier FT1 and FT2 and applies, from what corresponds to the plate of ST1 in switch ST1 and ST2, a positive signal through lead 89 to control grid 105 to clearout tube COR1. A negative signal thus appears at plate 71 of COR1 and is applied in parallel through lead 101 to the grids of the entire series of relay tubes, RR1 through RR15, typified by grid 106 of RR1, thereby switching any of the RR tubes which might by conducting from a previous transmission over into a non-conducting state. The negative signal from plate 71 of COR1 will have no effect on the RR series tubes which are in a non-conducting condition since they will be biased below cutoff. The aforementioned zero pulse will also have been applied to common cathode lead 107 of the AR series tubes so as to overcome, during the duration of the pulse, the fixed positive bias applied at 14. This cathode bias removal will be rendered impotent, however, by the fact that the zero state of the AR series is such that their grid biases are all held by the counter circuit at a value which will not permit conduction even when the cathode bias is removed. It may be noted here that an ARO stage, if one were employed, would logically have been rendered conducting by the zero pulse. The counter, having begun to feed on the output of squaring amplifier FT1 and FT2, places the AR series in its number one condition which comprises AR1 capable of conducting insofar as its grid bias is concerned. AR1 cannot conduct, however, because of cathode bias at 14. The second pulse in the received pulse group, which was designated the number two pulse, arrives at input 69 to the receiver control selector coincident with the third positive oscillation of oscillator OT1 at a time when the AR series is in its number two state. This means that AR2 is prepared to conduct by the counter circuit insofar as grid bias is concerned. The number two received pulse removes the cathode bias from the AR series and AR2 conducts. This conduction by AR2 places, through lead 88, a negative signal on grid 108 of IR2, which is in its normally conducting state, and stops conduction. The positive potential from plate 75 of IR2 is applied through lead 87 to grid 76 of RR2 to render it conducting in the normal manner of an electronic switch. Conduction by RR2 energizes relay coil 77 in its plate circuit and the function for which number two pulse was intended is instituted. Between the time the number two pulse is applied to input 69 and the number eleven pulse (as hereinbefore designated) is applied, squaring amplifier FT1 and FT2 continues to feed the counter which in turn removes the grid bias successively from AR3 down the series through AR11. During the interval in which AR11 has its grid 78 unbiased, number eleven pulse arrives, unbiases cathode 79 and relay 80 in the plate circuit of RR11 is closed in the same manner as relay 77 in the plate circuit of RR2. No more pulses exist in this group and oscillator OT1 continues its sine wave production until the counter is returned to its zero state. This return of the counter to its zero state sends a signal to electronic switch ST1 and ST2 which stops oscillator OT1, biases off squaring amplifier FT1 and FT2, and sends a negative signal to grid 105 of clearout tube COR1 which, as hereinbefore described, is unresponsive to negative signals. The return of the counter to its zero state also places the AR series in its zero state so that all AR tubes are biased off with respect to their grids. The entire receiver control selector has been placed in its zero state, and is ready for the arrival of another pulse group. The net result of the group just received has been to close, and leave closed, relays 77 and 80 in the plate circuits of RR2 and RR11. This was the original intention of the operator of the transmitter equipment in closing switches BT2 and BT11 of FIG. 2. Thus it can be seen that the structure of the received pulse group has been fitted into a pattern by the receiver control selector, analyzed, and employed to actuate the controls desired by the operator.

In FIG. 3A, voltage waveforms are plotted against time in such a fashion as to illustrate the sequence of events in certain parts of the receiver selector circuit operation described above. Waveform 15 is the envelope of the received pulse group which is impressed upon input 69 to the receiver control selector. Waveform 16 represents the signal from the clearout tube COR1 to the grid circuits of the RR series of tubes. Waveform 17 is the sine wave output of oscillator OT1. Waveform 18 represents the rectangular positive pulse output of squaring amplifier FT1 and FT2 which is communicated through a low time constant circuit to shape waveform 19 at counter input 81. The time intervals between the negative pulses of waveform 19 which trip the counter are labeled according to the tube in the AR series which has its grid bias removed during the interval. Waveform 20 represents the signal applied to common cathode lead 107 of the AR series tubes by a pulse group such a that described in explaining the operation of these circuits.

In actual operation, a pulse group arriving at the receiver control selector will ordinarily find one or more of the relays in the plate circuits of the RR series tubes in an energized condition. As hereinbefore outlined, the zero pulse of the incoming group will trip electronic switch ST1 and ST2 which causes clearout tube COR1 to send the clearout pulse shown as waveform 16 in FIG. 3A to the grids of the RR series tubes and render those which were conducting (relay energized) non-conducting. If, however, the incoming pulse group contains a function pulse which calls for the energizing of a relay which has just been cleared out, the relay contact will not be opened since the maximum time interval between the zero pulse and any function pulse is of the order of a millisecond which is far too short for the mechanical relay contacts to open. Let it be assumed that the pulse group patterned by the closing of BT2 and BT11 in the transmission equipment and comprising zero pulse, number two pulse, and number eleven pulse has arrived and instituted the functions corresponding to those switches. The operator now desiring to terminate both these functions, opens TT1 of FIG. 2 and dispatches a transmission consisting only of zero pulse as previously outlined. The arrival of this transmission at the receiver control selector starts the cycle of operation as before but no pulses after the zero pulse arrive to remove cathode biasing voltage 14 during any of the intervals during which any of the AR series tubes would have conducted. The relay clearout, accomplished by the arrival of the zero pulse therefore remains in effect and relay coils 77 and 80 in the plate circuits of RR2 and RR11 remain de-energized and the corresponding functions are terminated.

It will be seen that the just described mode of operation of the transmitter and receiver is non-repetitive. Each transmission, even though it include only the zero pulse, required that the operator initiate the transmitter operation by opening or closing switch TT1 or one of the BT series switches in the transmitter selector. It will also be seen that there may be circumstances, such as the presence of interfering signals, under which it would be desirable or necessary to repeat the selected transmission at a rapid rate without the necessity of mechanically opening and closing a toggle switch. For the purpose of providing a repetitive mode of operation, there may be included in the transmitter selector a means of producing a series of negative triggering pulses at a frequency equal to the desired repetition rate. The upper limit on this repetition rate is, of course, fixed by the time duration of the actual transmission cycle. For example, and as hereinbefore mentioned, oscillator OT1 of the transmitter selector may be so chosen as to have a frequency of ten kilocycles. Since approximately 16 cycles of OT1 represents a complete transmission cycle, the time involved would be 1600 microseconds. This fixes the upper repetition rate at 625 per second for the particular embodiment shown. In FIG. 4 is shown a free running multivibrator which is typical of the devices which may be used to secure a repetitive mode of operation of the control system components illustrated in FIGS. 2 and 3. The circuit shown is entirely conventional in operation and consists simply of a two stage resistance-capacitance coupled amplifier with the output of the second stage connected to the input of the first. The cycle consists of periods during which first one half and then the other half of the tube is cut off separated by very rapid switching from one condition to the other so as to cause to appear at the plates of the tube a series of substantially rectangular pulses. The repetition rate of these rectangular pulses can be fixed as desired by proper choice of the circuit elements principally capacitors 109 and 110 and resistances 111 and 112. There will appear at plate 113 a negative excursion of voltage once each cycle as the right hand side of the tube transits from a non-conducting state to a conducting state. These negative excursions of voltage at plate 113, communicated through capacitor 114 to point 116 in the grid circuit of ST1 of FIG. 2 cause to appear at grid 26 of ST1 the negative trigger pulses which initiate the transmission cycles at the repetition rate of the multivibrator. The positive pulses which reach grid 26 from the multivibrator of FIG. 4 are rendered impotent by the fact that electronic switch ST1 and ST2 is, by its construction, responsive only to negative pulses applied to grids 26 and 27. In this repetitive mode, switch TT1 may be opened and a series of groups containing only the zero pulse will be transmitted. If TT1 is closed, there will be transmitted a series of groups containing not only the zero pulse but also those pulses corresponding to those of the BT series switches which are closed by the operator. As hereinbefore described, the effect of repeated identical signals upon the receiver selector of FIG. 3 will be only to cause the circuit to go through its electrical changes without disturbing the condition of the relays.

There will be readily recognized the necessity for reasonably stable frequency operation of the selector oscillator in the transmitting equipment and the selector oscillator in the receiving equipment. An examination of the waveforms in FIG. 3A will reveal the fact that, if the receiver selector oscillator frequency had been as much as one half cycle fast in eleven periods of the transmitter selector oscillator, the number eleven pulse would have arrived at a time when AR12 rather than AR11 was unbiased at its grid. Likewise, if the receiver oscillator has been slow by a half cycle, AR10 rather than AR11 would have been unbiased. Thus, a general approximation for this particular application is that the two oscillators must be operating at frequencies which do not differ by more than an amount which would cause 180° phase change in a pulse group of maximum time duration. For a group containing a maximum of sixteen pulses, the time duration is fifteen and one half periods in terms of the transmitter selector oscillator frequency. In order to provide the correct pattern for this pulse group, the receiver selector oscillator must not in the same length of time have generated less than fifteen or more than sixteen cycles. This calls for a receiver selector oscillator frequency which must be within approximately three and one half percent of that in the transmission equipment. While this approximation neglects the time duration of the pulse proper and certain other minor factors, the allowable range of frequency variation is considerably more than that provided by the proper design and operation of oscillator equipment. Experience has shown that reasonable care will prevent any incorrect analysis by the receiver control selector of any incoming pulse group because of oscillator frequency variations. It will be apparent that the transitron oscillators employed in the circuits of FIGS. 2 and 3 could, with appropriate circuit changes, be replaced by any type of time base generating device the accuracy of time interval determination of which is sufficient for the requirements as outlined above. This time base generator might take the form of one of many conventional oscillators, multivibrators, artificial delay lines, sawtooth generators, and even mechanical clocking devices where the time unit duration was suitable.

It will also be apparent that the radiant energy signals sent out by the transmission equipment could have been used to provide control intelligence to a plurality of drone aircraft. In the case of drone aircraft, however, identical signals to a plurality of drones would not be practical for obvious reasons. Such drone squadron control is provided by any of several means, such as the use of a plurality of transmission equipments operating on different frequencies to which their respective drones are tuned, or, such as the use of a single transmission equipment which can selectably transmit pulses having different, definite pre-determined characteristics corresponding to each of the drones to be controlled, each such drone being receptive only to the particular pulse type intended for its control in the manner outlined in the aforementioned Cleeton et al application. This drone squadron control is also accomplished by increasing the number of counter stages in a single transmitting equipment to the total required for separate operation of a plurality of drones. Each drone, while provided with a similar number of counter stages, would be provided only with the number of AR - IR -RR - stages necessary for its individual control. For example, let it be assumed that seven controlled functions are adequate to maneuver and otherwise operate a single drone aircraft. The transmission equipment would, for a four drone squadron, comprise a five stage, or scale of 32 counter complete with 29 AT stages and appropriate accessory stages. Switches BT1 through BT7 would be allotted to drone number one, switches BT8 through BT14 to drone number two, BT15 through BT21 to drone number three and BT22 through BT29 to drone number four. Each of the drones would be supplied with reception equipment comprising a five stage counter but only those AR - IR - RR - stages corresponding in number to the BT switches allocated in the transmission equipment to that particular drone. The particular embodiment of this invention which has been described, only partially illustrates the possible application of the invention. By taking advantage of the principle of having a timing device in the receiving equipment, the operation of which is initiated by a signal from the transmission equipment also equipped with a timing device, many variations of radio pulse signalling systems are possible. For example, in a system where the number of pulses in the transmitted group are important rather than their formation it is only necessary that the first and last pulse in the group be transmitted so as to bracket the transmission interval. Then at the receiver the first pulse may be utilized to start the timing device while the second of the two pulses is filtered as above described through the pulse amplifying channel in accordance with its time relation to the first pulse. Inasmuch as the number of unit time intervals is selectable at the transmitter and determinable at the receiver, the intelligence would be conveyed by the total time interval bracketed by the two pulses. No figures are included in this disclosure to illustrate this particular embodiment inasmuch as the circuits shown in FIGS. 2 and 3 could readily be adapted to this type of operation. This particular embodiment represents a distinct improvement over any system of pulse signalling system which includes no time base generator at its receiver and depends upon counting a number of regularly spaced pulses, all of which must be transmitted, in order to determine the total time interval involved. As can be seen, such a pulse signalling system, depending as it does upon the transmission of every pulse for the sole purpose of being able to determine the time interval between only the first and last pulse, places a severe load upon the transmitter. The necessity of transmitting only the bracketing pulses of a time interval as is made possible by suitable application of this invention represents either a considerable economy in transmitter equipment or a considerable increase in usable pulse power.

Given knowledge of the ratio pulse signalling system which is herein disclosed, an extremely wide variety of variations, both in mode of operation and in application, will occur to those well versed in the art. An example of this would be the ease with which the teachings of this invention provide the means for communication in the form of a teletype system. As is well known from the general mathematical formula of combination, $n$ things taken $m$ at a time yield $$\frac{n!}{m! (n-m)!}$$

combinations so that any five of the channels n provided by the time base generators of FIGS. 2 and 3 will provide a total of 31 distinct combinations. That is, since the channels chosen to provide the *n* factor may be energized in any combination from one to all five at a time, the combination formula yields 30 combinations for *m* factors of one to four, the thirty-first combination being obtained when the five channels are energized together.

It is realized that the toggle type on-off switches utilized at the transmitter selector for drone control as herein described would not represent an ideal keying system under all circumstances. For other applications, push button switches or other keying methods, either mechanical or electronic may be employed.

Various other applications of the invention may be made and various modifications may be made in the invention without department from the spirit thereof.

What is claimed is:

1. A radio pulse signalling system comprising, in combination:
   means for generating a first time base consisting of a finite number of regularly time-spaced pulse signals;
   first means for forming a pulse code group from said time base signal in accordance with a preselected pattern, said pulse code group always including an initial starting pulse;
   means for transmitting a pulsed radio wave corresponding to said pulse code group;
   means for receiving said pulsed radio wave at a remote point;
   means, actuated by the initial starting pulse in said received wave, for generating a second time base corresponding to said first time base; and
   second means for forming a pulse code group corresponding to the transmitted pulse code group from said second time base signal.

2. A radio pulse signalling system as in claim 1, wherein said first means for forming a pulse code group includes a plurality of amplifiers each having its individual switching means, each amplifier being arranged for operation in accordance with the state of its associated switching means, so that any or all of said amplifiers can be made to operate in accordance with a preselected pattern for said pulse code group.

3. A radio pulse signalling system as in claim 1, further including:
   a plurality of means, each operable upon receipt of a different one of said pulses in the pulse code group of said second means, for actuating a set of utilization devices.

4. A radio pulse signalling system, comprising means generating a first time base which is comprised of a predetermined number of regularly time spaced pulse signals, a plurality of keying channels equal in number to the number of pulses in the time base arranged to receive and to be consecutively energized by the pulse signals of said time base, switching means incorporated in said keying channels arranged to selectively permit or suppress operation by any of said channels, means transmitting a pulse radio wave in response to the operation of said channels, means receiving said radio pulse waves at a remote point, a time base generating means at said remote point for generating a second time base which is comprised of a similar predetermined number of regularly time spaced pulse signals, means initiating action by said time base generator in response to the first received radio wave, a plurality of normally blocked receiver control channels equal in number to the number of pulse signals in the second time base, means fed by said time base generator for sensitizing said receiver control channels one at a time in succession, and means feeding said received pulse waves to said receiver control channels in parallel.

5. A radio pulse signalling system, comprising means generating a first time base which is comprised of a predetermined number of regularly time spaced pulse signals, a plurality of keying channels equal in number to the number of pulses in the time base arranged to receive and to be consecutively energized by the pulse signals of said time base, switch means incorporated in said keying channels arranged to selectively permit or suppress operation by any of said keying channels, means transmitting a pulse radio wave in response to the selective operation of said channels, means receiving said radio pulse waves at a remote point, a time base generating means at said remote point for generating a second time base which is comprised of a similar predetermined number of regularly time spaced pulse signals, means initiating action by said time base generator in response to the first received radio pulse wave, a plurality of normally blocked receiver control channels equal in number to the number of pulse signals in the second time base, each of said receiver channels including a dual stability trigger circuit therein arranged for selective operation thereby, means fed by said time base generator for sensitizing said receiver control channels one at a time in succession, and means feeding said received pulse waves to said receiver control channels in parallel.

6. A radio pulse signalling system, comprising means generating a first time base which is comprised of a predetermined number of regularly time spaced pulse signals, a plurality of keying channels equal in number to the number of pulses in the time base arranged to receive and to be consecutively energized by the pulse signals of said time base, switch means incorporated in said keying channels arranged to selectively permit or suppress operation by any of said channels, means transmitting a pulse radio wave in response to the selective operation of said channels, means receiving said radio pulse waves at a remote point, a time base generating means at said remote point for generating a second time base which is comprised of a similar predetermined number of regularly time spaced pulse signals, means initiating action by said time base generator in response to the first received radio pulse wave, a plurality of normally blocked receiver channel equal in number to the number of pulse signals in the second time base, each of said receiver channels including a dual stability trigger circuit incorporated therein under control thereof, means feeding said received pulse waves to said control channels in parallel, means fed by said time base generator for rendering said control channels sensitive in succession to said received pulse waves, and means resetting said trigger circuits in response to the first received pulse wave, in a transmission.

* * * * *